March 8, 1932.  C. W. TOWT  1,848,398
APPARATUS FOR PREVENTING FROST DAMAGE TO VEGETATION
Filed July 21, 1930   2 Sheets-Sheet 1
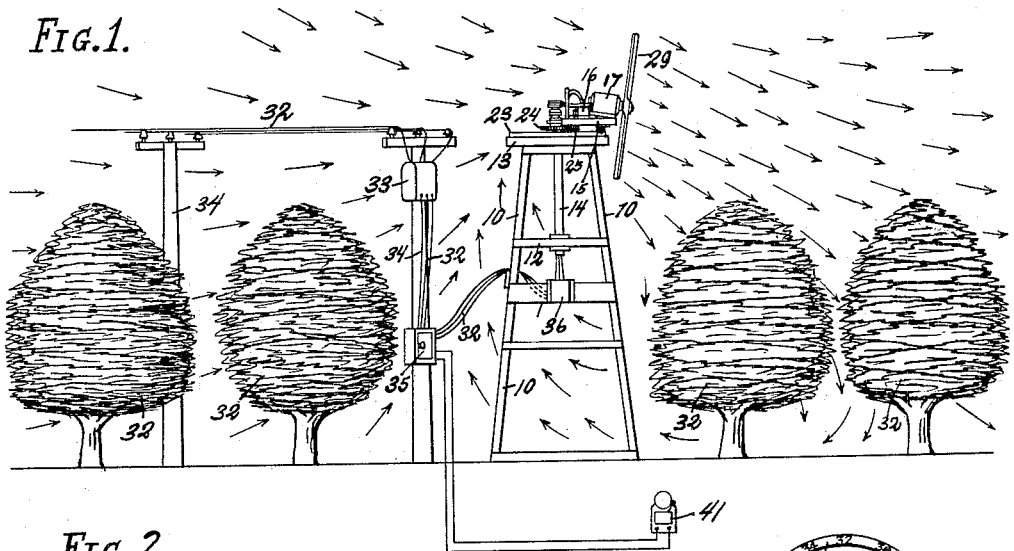
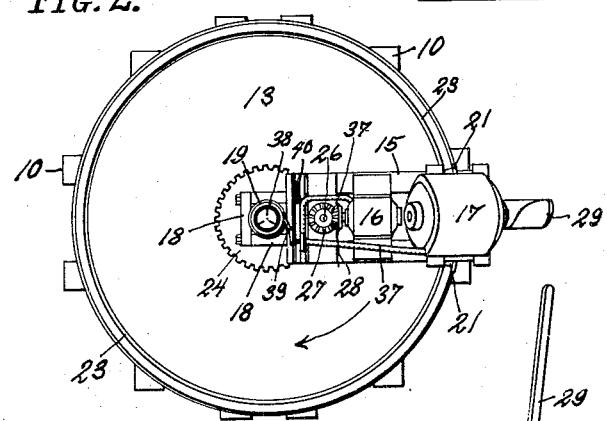
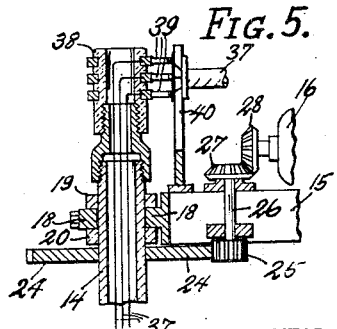
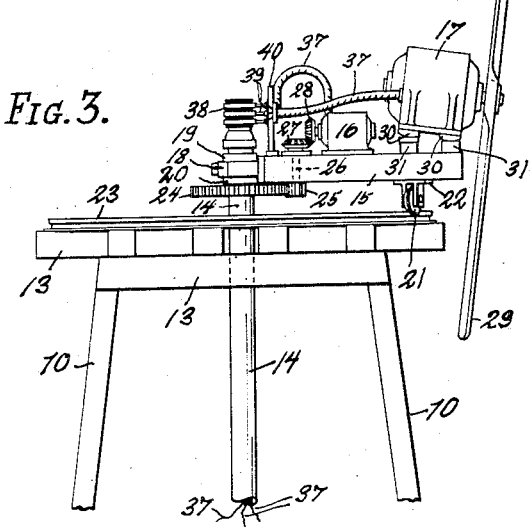
INVENTOR.
CHARLES WARREN TOWT
BY
Lockwood & Lockwood
ATTORNEYS.

March 8, 1932. C. W. TOWT 1,848,398
APPARATUS FOR PREVENTING FROST DAMAGE TO VEGETATION
Filed July 21, 1930 2 Sheets-Sheet 2
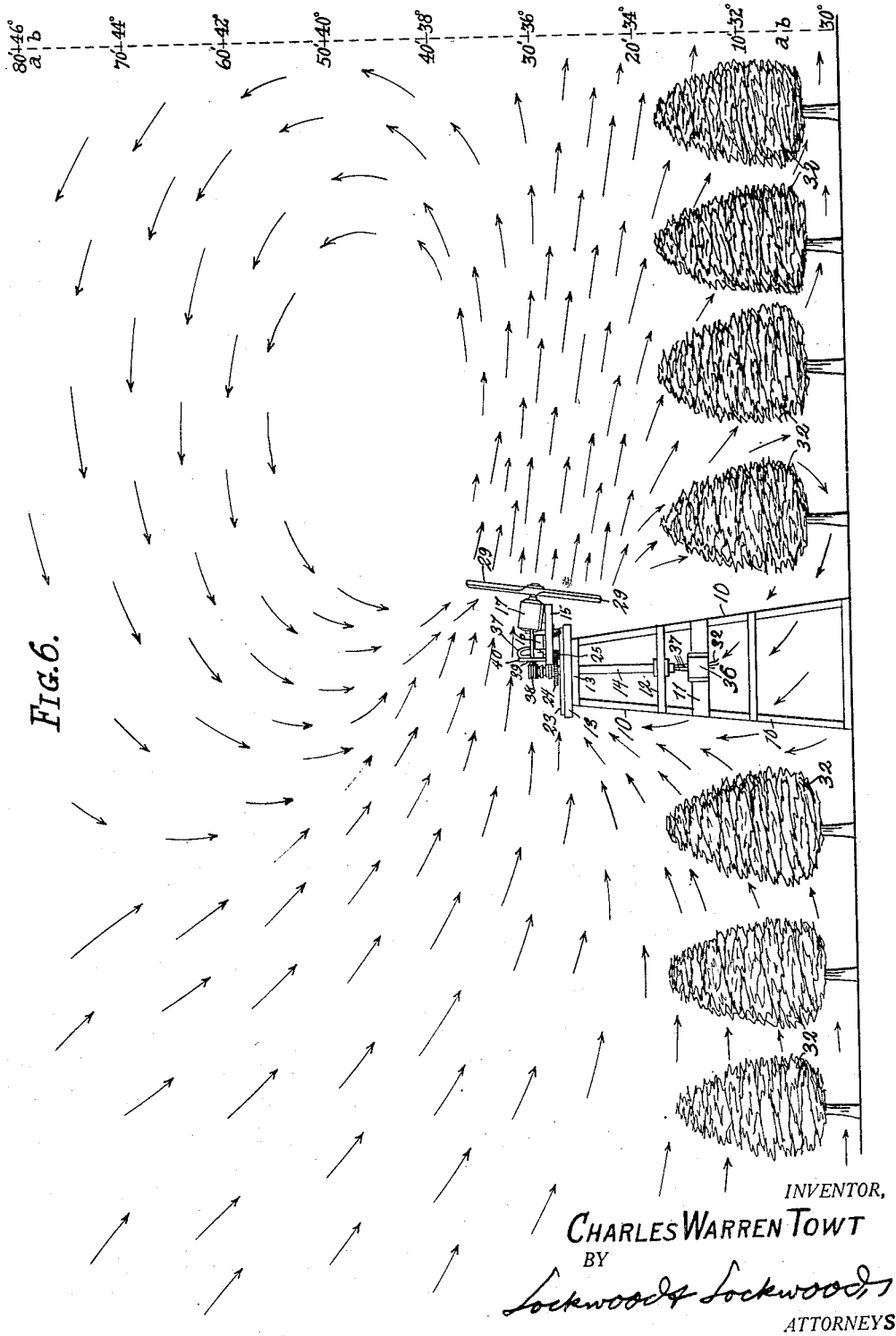
INVENTOR,
CHARLES WARREN TOWT
BY
Lockwood & Lockwood
ATTORNEYS.

Patented Mar. 8, 1932

1,848,398

UNITED STATES PATENT OFFICE

CHARLES WARREN TOWT, OF LINDSAY, CALIFORNIA, ASSIGNOR TO CHARLES WARREN TOWT AND DONALD GALE TOWT, AS TRUSTEES OF THE CHARLES WARREN TOWT HOLDING COMPANY, A COMMON-LAW TRUST OF CALIFORNIA

APPARATUS FOR PREVENTING FROST DAMAGE TO VEGETATION

Application filed July 21, 1930. Serial No. 469,407.

This invention relates to a means for preventing frost from damaging growing vegetation such as orchards and the like and the principal object is to provide an apparatus that is effective to accomplish a desired result and which is automatically placed in operation when the temperature has reached a degree in which there is danger of frost seriously injuring the vegetation.
As is well known there are large areas in central and southern California, Arizona, Texas, Mississippi and Florida devoted to fruit culture in which the temperature rarely reaches a degree of freezing; but occasionally and constantly recurring are a few cold winter nights in which frost occurs that does great damage to the growing vegetation, and experience has shown that a major portion of this damage can be avoided by a proper circulation of the air to prevent the moisture therein from settling on the vegetation in the form of dew which, on freezing, causes a great injury thereto. Also as is well known, the stratum of air in and around an orchard on such frosty nights does not vary greatly in temperature with the air in the upper stratum within the first hundred feet being slightly warmer than that adjacent the ground, consequently an object of this invention is to provide an apparatus capable of displacing the colder stratum of air in an orchard adjacent the ground and replacing it with the warmer air drawn out of the upper stratum.
The foregoing result is accomplished by arranging a large propeller angularly to a horizontal line and while moving it in a circle around a central vertical axis also drive it at sufficient speed to displace the cold air adjacent the ground and causing the warmer air in the upper stratum to flow inwardly toward a central point and downward through the propeller to replace the displaced air, thereby raising the temperature in the orchard sufficiently to prevent frost.

Another object of the invention is to provide a simple means for automatically starting and stopping the propeller motor when the temperature in the orchard has fallen below or risen above a predetermined degree. This is accomplished by having a thermostat in the motor circuit arranged to be operated by the near-ground temperature so as to open or close the circuit as may be required.

A feature of invention is shown in mounting the propeller motor on cam shims so that the angle of the propeller relative to a horizontal plane can be adjusted to suit the lay of the orchard land.

Features of invention are shown in the construction, combination and arrangement of parts whereby a frost prevention apparatus is provided that is easy to construct, install and maintain in operative condition, which also is strong and durable in use and automatically placed in operation when necessary.

A feature of invention is shown in the novel means for rotating the revolving platform at a fixed speed so the propeller can be moved in a large circle to agitate the air in a large circular area.

Another feature of invention is shown in the novel means for transferring the current from the power line to the motor.

Other objects, advantages and features of invention may appear from the accompanying drawings, the subjoined detailed description and the appended claims.

The accompanying drawings illustrate the invention in which:

Fig. 1 is a perspective view of an apparatus for preventing frost in orchards and the like that is constructed in accordance with this invention with parts shown diagrammatically and the direction of the displaced air indicated by arrows; and also diagrammatically indicating a thermostat motor control and an alarm in circuit with the drive motor. Fig. 2 is a slightly enlarged plan view of the apparatus shown in Fig. 1 with parts indicated semi-diagrammatically. Fig. 3 is an enlarged fragmental side view of the apparatus shown in Fig. 2 indicating the approximate inclination of the motor and propeller to drive an air blast downwardly into an orchard. Fig. 4 is a central vertical section through the thermostat motor control showing one of the contacts out of circuit, and also indicating other parts semi-diagrammatically. Fig. 5 is a fragmental vertical section through the upper end portion of the apparatus showing the means for mounting the revolving platform and also showing the means for transferring the electrical current from the annular contacts on the stand pipe to the motors. Fig. 6 is an enlarged semi-diagrammatical side view of the apparatus arranged in an orchard and showing the direction of the air currents, and also a scale indicating the approximate temperatures at various elevations on a frosty night or at a time when frost is liable to injure the orchard or like vegetation.

The apparatus includes a tower 10 that can be constructed in any well known way to support the lower, intermediate and top platforms 11, 12 and 13, and the tower can be erected in any part of an orchard, garden, nursery or plantation where it will be the most effective in performing its function of preventing frost from seriously damaging growing vegetation.

A hollow standpipe 14 has its lower end portion secured to the intermediate platform 12 so it cannot revolve and it is arranged centrally and vertically in the tower with its upper end extended through the upper platform and for some distance above it. Also the upper end of this pipe is secured to the upper platform so that it forms a pivot for the revolving platform 15 that carries the motors 16, 17 by which the apparatus is operated.

The revolving platform 15 at its inner end has a bearing 18 rotatably mounted between the collars 19, 20 that are secured in any well known way to the pipe 14, so the bearing has very little vertical play but so the frame 15 can revolve around the pipe.

The outer end of the frame 15 is supported on flanged wheels 21 mounted in bearings 22 that are secured to the underside of the frame 15 so the wheels 21 can run freely on the annular track 23 that is secured to the top platform 13 as best shown in Figs. 2 and 3.

The platform 15 is rotated around the pipe 14 by means of the motor 16 that is in driving connection with the fixed gear 24 through the pinion 25, shaft 26, bevel gear 27 and driving bevel gear 28 fixed to the shaft of the motor 16.

The gear 24 is fixed to the pipe 14 so it cannot turn so that when the motor 16 is driven it will cause the platform to revolve around the pipe 14 at a relatively fixed speed that is determined, of course, by the size of the gear 24 and pinion 25. The speed at which the platform will revolve will increase with the size of the pinion 25 and vice versa.

The platform 15 is revolved so it will carry the propeller motor 17 and propeller 29 around in a relatively large circle at a pre-determined speed so that when the motor 17 is driven it will actuate the propeller 29 that is mounted on one end of the motor shaft so it will draw the air from an area above the tower and drive it downwardly and outwardly from the vertical center of the tower 10. The motor 17 is mounted on the adjustable cam shim 30 on blocks 31 so that its angle of inclination can be adjusted to suit conditions in various orchards or lands. In other words the inclination of the motor 17 is adjustable to the inclination of the land. Normally, however, the propeller 29 and motor 17 are inclined downwardly about ten degrees from a horizontal plane when the tower is erected on level land so that the propeller 29 will drive the air down into the trees 32 in close proximity to the tower.

The propeller 29 is arranged and driven at a speed sufficient to displace the air in an area equal to about ten or twelve acres and in such a manner as to stir the air in the area continuously, thereby causing the leaves of the trees or foliage to keep in constant motion such as will prevent the deposit of dew on the foliage and consequently prevents frost from seriously injuring the growing vegetation.

The action of the propeller 29 is to draw the air down from the warmer strata above the orchard and then drive it with great force outwardly and downwardly into all parts of the orchard, it being understood that the propeller is continuously moved in a circle while in operation so as to displace and circulate the air in a large circular area.

The action of the propeller 29 and movement of the air is very carefully and fully illustrated in Fig. 6, and as seen therein the air from the warmer strata above the orchard is drawn down toward the top vertical center of the tower and then driven by the propeller downwardly and outwardly into the low temperature stratum next to the ground.

In the right end of Fig. 6 a scale is shown indicating the temperatures at various elevations in, around and over an orchard as experience shows prevails on frost-killing nights such as occasionally occur in semi-tropical countries such as southern California, Arizona, Texas, Mississippi and Florida. As seen therein, the ground temperature is indicated at 30° or two degrees below freezing or a temperature injurious to growing vegetation if the low area moisture is permitted to settle as dew on the foliage and freeze. The elevation is indicated in feet by the numerals designated by $a$ and the temperature in degrees by the numerals designated $b$.

As will be noted by the scale the temperature rises two degrees in every ten feet for the first hundred feet, after which the air temperature ordinarily passes out of the vegetation and ground influence and becomes colder as the elevation increases. If the warmer air is drawn down and driven into the area adjacent the ground it is obvious that the temperature around the trees of an orchard will be raised sufficiently to prevent serious damage to growing vegetation when the change in temperature required to obtain this result is only a few degrees, rarely more than ten degrees and more often only about two degrees.

The motors 16 and 17 can be driven in any well known way but if it is possible the current is preferably supplied by a high power line 32 to a transformer 33 on the pole 34, and is then transmitted to the central thermostat 35 that preferably is arranged in a horizontal plane between the top and bottom of the trees.

From the thermostat 25 the current is conducted to the control box switch 36 and through wires 37 through pipe 14 to the distributor head 38 fixed to the top end of the pipe 14. The current is taken off the distributor head 38 by brushes 39 that are fixed to a post 40 that revolves with the platform 15, and the brushes are connected to the motors in the usual way.

All of these parts are old in the art and for that reason are not shown or described in detail.

The construction and operation of the thermostat 35 is semi-diagrammatically shown in Fig. 4 and it is arranged to operate at a predetermined degree of temperature to start the motors and also sound an alarm bell 41; when the temperature in the orchard is equal to the degree in which the thermostat is set to operate.

This thermostat includes a coiled spring 42 that has one end secured to a tilting glass tube 43, having the usual center pivot 44 indicated by dotted lines so it is secured from displacement but so it can rock on the pivot 44.

The tube 43 is filled with sufficient mercury 45 to normally cover one of the contacts 46, 47 that are in circuit with the motors and power line by the usual wiring as indicated at 48 and 49.

The other end of the spring 36 is extended through a guide 50 and is secured by a pin 51 to a lever 52 pivoted to the bearing pin 53. The other end of the lever 52 is extended over a graduated scale 54 with means, not shown, for holding it in a set position. The scale indicates the temperature at which the thermostat is to automatically start the motor and sound an alarm.

As indicated in Fig. 4 the lever 52 is set on the scale at 30°. When the temperature reaches that point in the orchard it will vary the temperature on the spring 36 so it will contact and tilt the tube 43 so the mercury will cover both contacts 46, 47 and thereby sound an alarm and start the motor.

It is obvious that a sufficient rise in temperature will automatically open the circuit between the contacts 46, 47 by returning the tube 43 to its normal position.

It is also obvious that the bell 41 can be arranged in the circuit so it is a great distance from the orchard if necessary.

In operation the apparatus is erected and arranged as described and the lever 52 set to sound an alarm and start the motors when the temperature in the orchard has fallen to a predetermined degree, or 30° as indicated in Fig. 4. When the circuit is closed between the contacts 46, 47 the alarm will immediately be sounded and the motors started. When the motors are started the propeller will be moved in a circle around the top of the tower and driven as described to circulate the air and prevent moisture from settling and freezing on the foliage.

I claim as my invention:

1. An apparatus for preventing frost damage to orchards and like vegetation including a tower having a top platform thereon, a revolving platform pivotally connected to said top platform, a propeller motor adjustably secured to said revolving platform, means for revolving said platform, means for actuating said motor, and a propeller driven by said motor for the purpose of taking the warmer air from above the tower and driving it downwardly and outwardly through the trees to keep their leaves dry and in motion so dew can not settle thereon and freeze.

2. An apparatus for preventing frost damage to orchards and like vegetation including a tower having a top platform, a revolving platform pivotally mounted on said platform, a propeller, a motor for driving said propeller that is adjustably secured on said revolving platform so as to tilt said propeller downwardly at an angle relative to a horizontal plane, and means for rotating said revolving platform when said propeller is driven for the purpose specified.

3. An apparatus for preventing frost damage to orchards and like vegetation including a tower having a top platform, a revolving platform pivotally mounted on said top platform, a propeller, a motor for driving said propeller that is adjustably secured on said revolving platform so as to tilt said propeller downwardly at an angle relative to a horizontal plane, and another motor adapted to rotate said revolving platform when said propeller is driven.

4. An apparatus for preventing frost damage to orchards and like vegetation including a tower having a top platform thereon, a revolving platform pivotally connected to said top platform, a propeller motor adjustably secured to said revolving platform, a propeller secured to the shaft of said motor and adapted to be driven thereby, a power line for supplying current to said motor, and a thermostat for opening and closing the circuit between contacts that are in circuit with said line and motor for the purpose specified.

5. An apparatus for preventing frost damage to orchards and like vegetation including a tower having a top platform thereon, a revolving platform pivotally connected to said top platform, a propeller motor adjustably secured to said revolving platform, a propeller secured to the shaft of said motor and adapted to be driven thereby, a power line for supplying current to said motor, contacts in circuit with said line and motor, and a thermostat for automatically opening and closing the circuit between said contacts to start and stop said motor at predetermined degrees of temperature.

6. An apparatus for preventing frost damage to orchards and like vegetation including a tower having a top platform thereon, a revolving platform pivotally connected to said top platform, a propeller motor adjustably secured to said revolving platform, a propeller secured to the shaft of said motor and adapted to be driven thereby, a power line for supplying current to said motor, contacts in circuit with said line and motor, a thermostat for automatically opening and closing the circuit between said contacts to start and stop said motor at predetermined degrees of temperature, and other means for rotating said revolving platform when said motor is actuated to drive said propeller.

7. An apparatus for preventing frost damage to orchards and like vegetation including a tower, a top platform thereto, a vertical pipe arranged centrally and extended through said platform and secured from rotation, collars secured to said pipe, a bearing on said pipe arranged to rotate between said collars, a revolving platform having its inner end supported on said bearing, an annular track secured to said top platform, flanged wheels on the outer end of said revolving platform adapted to travel on said track, a propeller motor adjustably mounted on said platform, a propeller on the shaft of said motor, and means for rotating said revolving platform when said motor is actuated to drive said propeller.

8. An apparatus for preventing frost damage to orchards and like vegetation including a tower, a top platform thereto, a vertical pipe arranged centrally and extended through said platform and secured from rotation, collars secured to said pipe, a bearing on said pipe arranged to rotate between said collars, a revolving platform having its inner end supported on said bearing, an annular track secured to said top platform, flanged wheels on the outer end of said revolving platform adapted to travel on said track, a propeller motor adjustably mounted on said platform, a propeller on the shaft of said motor, and means including another motor for rotating said revolving platform when said propeller motor is actuated to drive said propeller.

9. An apparatus for preventing frost damage to orchards and like vegetation including a tower, a top platform thereto, a vertical pipe arranged centrally and extended through said platform and secured from rotation, collars secured to said pipe, a bearing on said pipe arranged to rotate between said collars, a revolving platform having its inner end supported on said bearing, an annular track secured to said top platform, flanged wheels on the outer end of said revolving platform adapted to travel on said track, a propeller motor adjustably mounted on said platform, a propeller on the shaft of said motor, a stationary gear secured to said pipe, another motor on said revolving platform, and a gear and shaft connection between said other motor and stationary gear whereby said revolving platform can be moved over said track when said propeller is actuated to rotate said propeller.

10. An apparatus for preventing frost damage to orchards and like vegetation including a tower, a top platform thereto, a vertical pipe arranged centrally and extended through said platform and secured from rotation, collars secured to said pipe, a bearing on said pipe arranged to rotate between said collars, a revolving platform having its inner end supported on said bearing, an annular track secured to said top platform, flanged wheels on the outer end of said revolving platform adapted to travel on said track, a propeller motor adjustably mounted on said platform, a propeller on the shaft of said motor, a stationary gear secured to said pipe, another motor on said revolving platform, a gear and shaft connection between said other motor and stationary gear whereby said revolving platform can be moved over said track when said propeller motor is actuated to rotate said propeller, an electric distributor head on said pipe, electric wires extending through said pipe to said head, and means whereby current from said head is distributed to said motors.

In witness whereof, I have hereunto affixed my signature.

CHARLES WARREN TOWT.